(12) United States Patent
Barry et al.

(10) Patent No.: US 9,083,502 B2
(45) Date of Patent: Jul. 14, 2015

(54) APPARATUS FOR DEDICATED HARDWARE AND SOFTWARE SPLIT IMPLEMENTATION OF RATE MATCHING AND DE-MATCHING

(71) Applicant: Alcatel-Lucent, Paris (FR)

(72) Inventors: Mark P. Barry, Murray Hill, NJ (US); Yi-Chen J. Li, Murray Hill, NJ (US); Oliver J. Ridler, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 130 days.

(21) Appl. No.: 14/021,295

(22) Filed: Sep. 9, 2013

(65) Prior Publication Data
US 2014/0013189 A1    Jan. 9, 2014

Related U.S. Application Data

(60) Division of application No. 12/153,488, filed on May 2, 2008, now Pat. No. 8,533,574, which is a division of application No. 11/826,900, filed on Jul. 19, 2007, now abandoned, which is a continuation of application No. 10/425,825, filed on Apr. 30, 2003, now Pat. No. 7,269,783.

(51) Int. Cl.
*H03M 13/00* (2006.01)
*H03M 13/03* (2006.01)
*H04L 1/00* (2006.01)
*H04L 1/08* (2006.01)

(52) U.S. Cl.
CPC ............ *H04L 1/0067* (2013.01); *H04L 1/0043* (2013.01); *H04L 1/0045* (2013.01); *H04L 1/0059* (2013.01); *H04L 1/0066* (2013.01); *H04L 1/0069* (2013.01); *H04L 1/0071* (2013.01); *H04L 1/08* (2013.01)

(58) Field of Classification Search
CPC ... H04L 1/0067; H04L 1/0043; H04L 1/0045; H04L 1/0059; H04L 1/0066; H04L 1/0069; H04L 1/0071; H04L 1/08
USPC .................................................. 714/774, 790
See application file for complete search history.

(56) References Cited

U.S. PATENT DOCUMENTS

| | | | |
|---|---|---|---|
| 4,016,361 A * | 4/1977 | Pandey | .......................... 348/476 |
| 5,383,066 A | 1/1995 | Kim | |
| 5,764,966 A | 6/1998 | Mote, Jr. | |
| 6,215,868 B1 | 4/2001 | Inoue | |
| 6,332,005 B1 | 12/2001 | Pehkonen | |
| 6,456,611 B1 | 9/2002 | Hu et al. | |
| 6,463,097 B1 | 10/2002 | Held et al. | |
| 6,580,762 B1 * | 6/2003 | Tsumura | ........................ 375/295 |

(Continued)

OTHER PUBLICATIONS

Nokia, Hardware/Software Partitioning, Apr. 8, 2003, IST-2001-34561, Information Society Technologies (IST), pp. 1-84.

*Primary Examiner* — Joseph D Torres
(74) *Attorney, Agent, or Firm* — Harness, Dickey & Pierce, P.L.C.

(57) ABSTRACT

In the method of rate-matching, software is used to calculate at least one rate-matching parameter for data, and dedicated hardware is used to perform at least one of a puncturing and repetition process on data based on the calculated rate-matching parameter. In rate de-matching, software is again used to calculate at least one rate de-matching parameter for received data, and dedicated hardware is used to compensate for puncturing and repetition based on the calculated rate de-matching parameter.

4 Claims, 8 Drawing Sheets

(56) References Cited

U.S. PATENT DOCUMENTS

| | | | |
|---|---|---|---|
| 6,674,807 B1* | 1/2004 | Park et al. | 375/265 |
| 6,697,986 B2* | 2/2004 | Kim et al. | 714/751 |
| 6,721,300 B1* | 4/2004 | Akiba et al. | 370/342 |
| 6,744,744 B1* | 6/2004 | Tong et al. | 370/320 |
| 6,813,736 B2* | 11/2004 | Wang et al. | 714/712 |
| 6,907,009 B2 | 6/2005 | Maruwaka et al. | |
| 7,051,261 B1* | 5/2006 | Dhamankar | 714/755 |
| 7,103,325 B1* | 9/2006 | Jia et al. | 455/101 |
| 7,146,552 B2* | 12/2006 | Kim et al. | 714/755 |
| 7,154,960 B2* | 12/2006 | Liu et al. | 375/267 |
| 7,243,294 B1* | 7/2007 | Divsalar et al. | 714/792 |
| 7,260,659 B2* | 8/2007 | Chen et al. | 710/62 |
| 7,269,783 B2* | 9/2007 | Barry et al. | 714/790 |
| 7,278,087 B2* | 10/2007 | Speth | 714/790 |
| 7,386,001 B1* | 6/2008 | Kim et al. | 370/442 |
| 7,391,727 B2* | 6/2008 | Yoon et al. | 370/232 |
| 7,415,263 B2* | 8/2008 | Kutz et al. | 455/334 |
| 7,437,655 B2* | 10/2008 | Morsberger et al. | 714/790 |
| 2002/0041640 A1 | 4/2002 | Le Bars et al. | |
| 2002/0085659 A1* | 7/2002 | Kim et al. | 375/377 |
| 2005/0113127 A1 | 5/2005 | Zhang et al. | |

* cited by examiner

APPARATUS FOR DEDICATED HARDWARE AND SOFTWARE SPLIT IMPLEMENTATION OF RATE MATCHING AND DE-MATCHING

PRIORITY STATEMENT

This is a divisional of and claims priority under 35 U.S.C. §121, 120 on U.S. application Ser. No. 12/153,488, filed May 20, 2008 (U.S. Pat. No. 8,533,574 B2, issued Sep. 10, 2013), which is a divisional of and claims priority under 35 U.S.C. §121, 120 on U.S. application Ser. No. 11/826,900, filed Jul. 19, 2007, which claims priority under 35 U.S.C. §120 on U.S. application Ser. No. 10/425,825, filed Apr. 30, 2003 (U.S. Pat. No. 7,269,783 B2, issued Sep. 11, 2007), the entire contents of each of which are incorporated herein by reference.

BACKGROUND OF INVENTION

Rate-matching is a technique widely used in 3G wireless communication systems, such as UMTS and CDMA2000, for adjusting the data size of the channel encoder outputs at the transmitter to the air interface capacity. Rate-matching applies puncturing or repetition to each channel's data based on well-known calculated rate-matching parameters. Within a channel, a puncture or repetition pattern is applied. A reverse process called rate de-matching is performed by the receiver side to restore the punctured/repeated data.

The conventional implementation of rate-matching and rate de-matching is to use software to do both parameter calculation and data processing (i.e., puncture and repetition as dictated by the parameter calculation). As used herein, software refers to instructions stored in memory, that when executed cause a general purpose processor, computer or controller to perform a particular function. Using software refers to the general purpose processor, computer or controller executing the instructions and thus performing the particular function specified by the software.

Unfortunately, a general purpose processor running software to perform rate-matching (e.g., a programmed digital signal processor (DSP)) requires in the order of 60 instruction cycles per bit of processed data to perform the puncturing and repetition process. The processor load required for processing 64 users is in the order of 240 million cycles per second which is an excessive load. The majority of the DSP's processing power is consumed with the puncturing/repetition processes, which are very simple iterative bit operations.

SUMMARY OF INVENTION

The present invention provides a rate matching and rate de-matching design that moves the puncturing/repetition process into dedicated hardware. Hardware refers to the physical aspect of computers, telecommunications and other information technology devices. Dedicated hardware means hardware having a particular structure that dictates the function performed by the hardware. For example, while a DSP is hardware, a programmed DSP is not dedicated hardware because the structure of the DSP does not change when the software running on the DSP changes. Examples of dedicated hardware include logic circuits, an application-specific integrated circuit (ASIC)—with or without a central processing unit (CPU), a field programmable gate array (FPGA), a complex programmable logic device (CPLD), etc. Dedicated hardware may be reconfigurable or non-reconfigurable. A FPGA is an example of reconfigurable dedicated hardware. Depending on how the FPGA is programmed, the gates in the FPGA form connections between logic elements such that the FPGA structure becomes dedicated to performing a particular function—becomes like a fixed logic circuit. The structure (i.e., the connection of the logic elements) may be changed by re-programming the FPGA; hence, the FPGA is reconfigurable. A fixed logic circuit is an example of non-reconfigurable dedicated hardware.

In the present invention, the dedicated hardware is able to process the data much more efficiently than using software, and using the dedicated hardware reduces the total processing load on, for example, the DSP. Namely, the dedicated hardware eliminates the processor cycles associated with the puncturing and repetition processes. Therefore, this design provides a more economical and faster implementation of rate matching and rate de-matching.

In an example embodiment, an apparatus for rate-matching includes a processor calculating at least one rate-matching parameter for data, a selector receiving a current data, a previous data and an output data, the selector configured to selectively perform at least one of a puncturing process and a repetition process, and a state machine circuit receiving the calculated rate matching parameters and for controlling the selector based on the calculated rate matching parameters.

In an example embodiment, a method of rate-matching includes using software to calculate at least one rate-matching parameter for data, and using dedicated hardware to at least one of selectively perform a puncturing process and selectively perform a repetition process on data based on the calculated rate-matching parameter. The using dedicated hardware step includes operating in one of a puncture and repetition mode based on a decision parameter value received from the using software step, and the puncturing process punctures the data in the puncture mode when the decision parameter value is less than a puncture decision threshold, and the repeating process repeats the data in the repetition mode when the decision parameter value is less than a repetition decision threshold.

In another example embodiment, a method of rate de-matching includes using software to calculate at least one rate de-matching parameter for received data, and using dedicated hardware to compensate for puncturing and repetition in the received data based on the calculated rate de-matching parameter. The using dedicated hardware step includes operating in one of a puncture and repetition mode based on a decision parameter value received from the using software step, and a compensating puncture process compensates for puncture in the received data when the decision parameter value is less than a de-puncture decision threshold, and a compensating repetition step compensates for repetition in the received data when the decision parameter value is less than a de-repetition decision threshold.

In yet another example embodiment, a method of rate-matching includes calculating at least one rate-matching parameter for data using software, selectively performing, using a selector, at least one of a puncturing process and a repetition process using current data, previous data and an output data received at the selector, and controlling the selector based on the calculated rate matching parameters using a state machine circuit.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein.

DETAILED DESCRIPTION OF THE EMBODIMENTS

General Architecture

Figure 1:
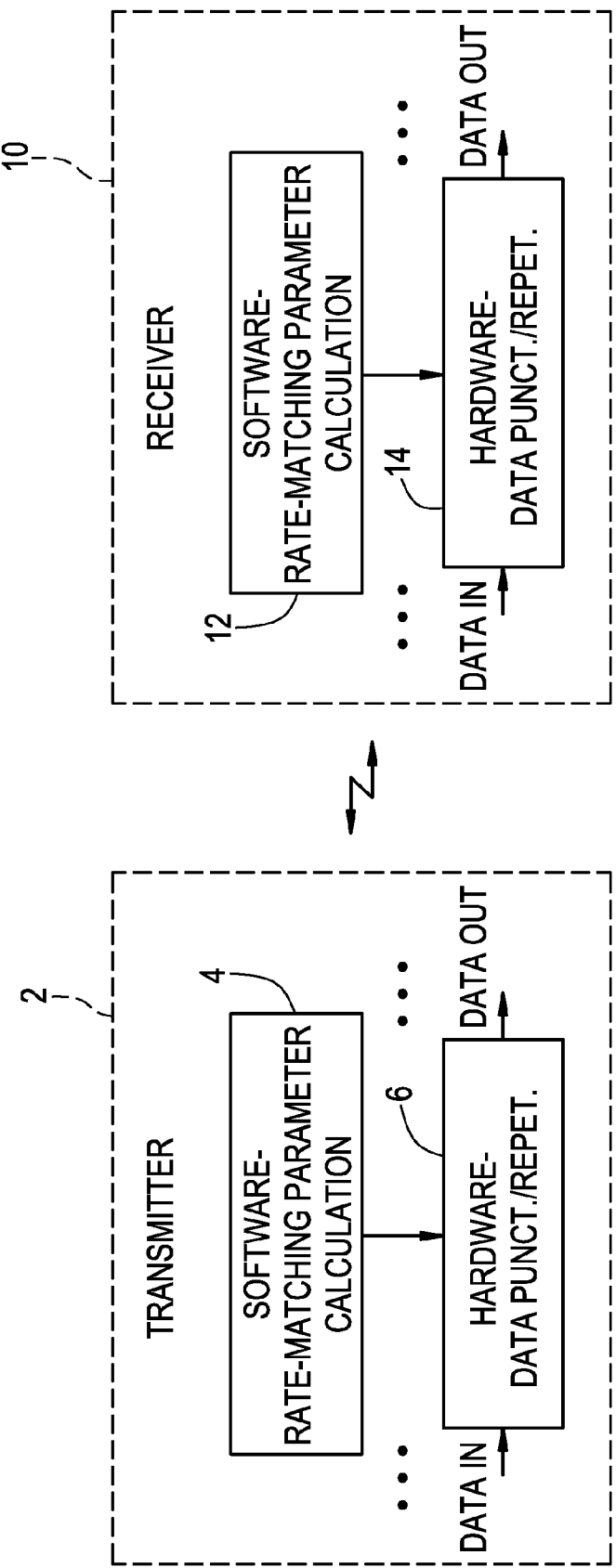
FIG. 1 illustrates a portion of a wireless communication system employing the method and apparatus according to the present invention.

FIG. 1 illustrates a portion of a wireless communication system employing the method and apparatus according to the present invention. As shown, at a transmitter 2, a digital signal processor 4 executes software to calculate rate-matching parameters in the well-known manner. These parameters are passed to dedicated hardware 6. The dedicated hardware 6 performs the data puncturing/repetition process on input data to generate rate-matched output data. The rate-matched data has a rate matched to the air interface of the wireless communication system.

As used herein, software refers to instructions stored in memory, that when executed cause a general purpose processor, computer or controller to perform a particular function. Using software refers to the general purpose processor, computer or controller executing the instructions and thus performing the particular function specified by the software.

As used herein, hardware refers to the physical aspect of computers, telecommunications and other information technology devices; and dedicated hardware means hardware having a particular structure that dictates the function performed by the hardware. For example, while a DSP is hardware, a programmed DSP is not dedicated hardware because the structure of the DSP does not change when the software running on the DSP changes. Examples of dedicated hardware include logic circuits, an application-specific integrated circuit (ASIC)—with or without a central processing unit (CPU), a field programmable gate array (FPGA), a complex programmable logic device (CPLD), etc. Dedicated hardware may be reconfigurable or non-reconfigurable. A FPGA is an example of reconfigurable dedicated hardware. Depending on how the FPGA is programmed, the gates in the FPGA form connections between logic elements such that the FPGA structure becomes dedicated to performing a particular function—becomes like a fixed logic circuit. The structure (i.e., the connection of the logic elements) may be changed by re-programming the FPGA; hence, the FPGA is reconfigurable. A fixed logic circuit is an example of non-reconfigurable dedicated hardware.

At a receiver 10, a digital signal processor 12 executes software to calculate rate de-matching parameters in the well-known manner. These parameters are passed to dedicated hardware 14. The dedicated hardware 14 performs the puncturing/repetition compensation process on input data to generate rate de-matched output data.

Because the structure and operation of the digital signal processor 4 in generating the rate matching parameters is so well-known (explained in 3GPP TS25.212 version 4.3.0 and other versions), these items will not be described in detail for the sake of brevity. For the same reasons, the structure and operation of the digital signal processor 12 in generating the rate de-matching parameters will not be described in detail. In the sections that follow, embodiments of the dedicated hardware 6 and the dedicated hardware 14 for performing the puncturing/repetition process and the puncture/repetition compensation process are described in detail.

Architecture of Dedicated Hardware for Puncturing/Repetition Process

Puncturing is the process of removing bits from a data packet to reduce its overall size. Repetition is the process of repeating bits in a data packet to increase its overall size. The rate at which data bits are punctured or repeated is controlled by rate-matching parameters.

In describing the dedicated hardware architecture for the puncturing/repetition process, first exemplary modes of operation will be mentioned, and then the rate-matching parameters received from the digital signal processor 4 will be defined. Afterwards, a state-machine dedicated hardware implementation of the present invention will be described in detail. Subsequently, a combinatorial logic dedicated hardware implementation will be presented.

Modes of Operation

An exemplary embodiment of the present invention may operate in 3 modes: repetition mode, normal puncture mode and turbo puncture mode. The mode of operation may be selected via the rate-matching parameters.

Definitions, Symbols and Abbreviations

Table 1 below provides a list of the names/symbols used for the rate matching parameters calculated in the digital signal processor 4 along with (i) their corresponding symbol or name in the 3GPP standard and (ii) associated description.

TABLE 1

| Name | In 3GPP Standard | Description |
| --- | --- | --- |
| eini1 | $e_{ini}$ | Initial value of decision parameter or variable e in the rate matching pattern determination algorithm. For repetition mode, normal puncturing mode and parity 1 bits in turbo puncturing mode. |

TABLE 1-continued

| Name | In 3GPP Standard | Description |
|---|---|---|
| eini2 | $e_{ini}$ | Initial value of decision parameter or variable e in the rate matching pattern determination algorithm. For parity 2 bits in turbo puncturing mode. |
| eplus1 (ep1) | $e_{plus}$ | Increment of variable e in the rate matching pattern determination algorithm For repetition mode, normal puncturing mode and parity 1 bits in turbo puncturing mode. |
| eplus2 (ep2) | $e_{plus}$ | Increment of variable e in the rate matching pattern determination algorithm. For parity 2 bits in turbo puncturing mode. |
| eminus1(em1) | $e_{minus}$ | Decrement of variable e in the rate matching pattern determination algorithm For repetition mode, normal puncturing mode and parity 1 bits in turbo puncturing mode. |
| eminus2(em2) | $e_{minus}$ | Decrement of variable e in the rate matching pattern determination algorithm. For parity 2 bits in turbo puncturing mode. |
| e value 1 | e in 4.2.7.5 | Value of variable e in the rate matching pattern determination algorithm For repetition mode, normal puncturing mode and parity 1 bits in turbo puncturing mode. |
| e value 2 | e in 4.2.7.5 | Value of variable e in the rate matching pattern determination algorithm For parity 2 bits in turbo puncturing mode. |
| TTI | TTI | Transmission Time Interval, the time interval between packets of data for a transport channel (TrCH). This time is a multiple of radio frames. |
| dlc_tr_emode | Coding scheme | Type of channel coding for a TrCH, No Coding, Turbo, Viterbi ½, Viterbi ⅓. |
| dlc_tr_niltti | $N_{i,l}^{TTI}$ | Number of bits in a transmission time interval before rate matching on TrCH i with transport format l. Used in downlink only. |
| dlc_tr_punc | sign of $\Delta N_{il}^{TTI}$ or $\Delta N_{i,l}^{TTI,m}$ | For $\Delta N_{il}^{TTI}$ and $\Delta N_{i,l}^{TTI,m}$: If positive - number of bits to be repeated in each transmission time interval on TrCH i with transport format l. If negative - number of bits to be punctured in each transmission time interval on TrCH i with transport format l. |

First Embodiment of Downlink Rate Matching Dedicated Hardware Architecture

Figure 2:
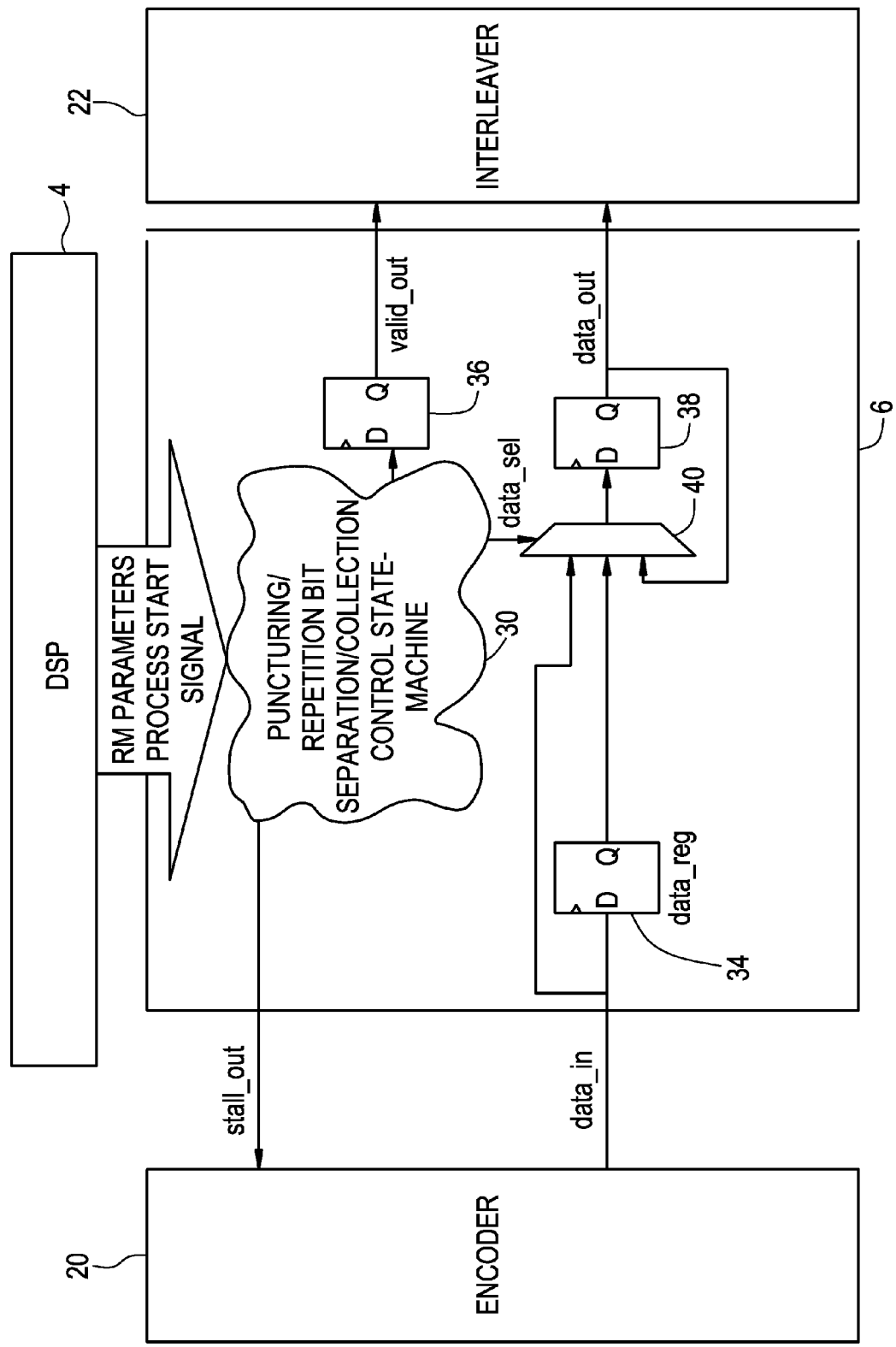
FIG. 2 illustrates a block diagram of the dedicated hardware architecture for rate matching at a transmit side according to one embodiment of the present invention, where the embodiment is employed between an encoder and an interleaver.

FIG. 2 illustrates a block diagram of the dedicated hardware architecture for rate matching according to one embodiment of the present invention, wherein the embodiment is employed between an encoder and an interleaver. As shown, on the input side, the dedicated hardware 6 receives the rate-matching parameters from the DSP 4, and receives input data data_in from an encoder 20. For the purposes of explanation only, four types of data (non-Turbo data, Systematic data, Parity 1 data and Parity 2 data) will be described in detail below. The dedicated hardware 6 also supplies the encoder 20 with a stall signal stall_out. On the output side, the dedicated hardware 6 outputs data data_out to, for example, an interleaver 22. The dedicated hardware 6 also outputs an output validity indicator valid_out.

The dedicated hardware 6 includes a first data register 34 storing the input data data_in, a second data register 36 storing the output validity signal valid_out and a third data register 38 storing the output data data_out. A state-machine 30 receives the rate-matching parameters from the DSP 4 and generates the output validity indicator valid_out. A selector 40 selectively outputs one of the current input data from the encoder 20, the previously input data stored in the second data register 34 and the data output from the fourth data register 38 based on a data selection signal generated by the state-machine 30.

State Machine

Figure 3:
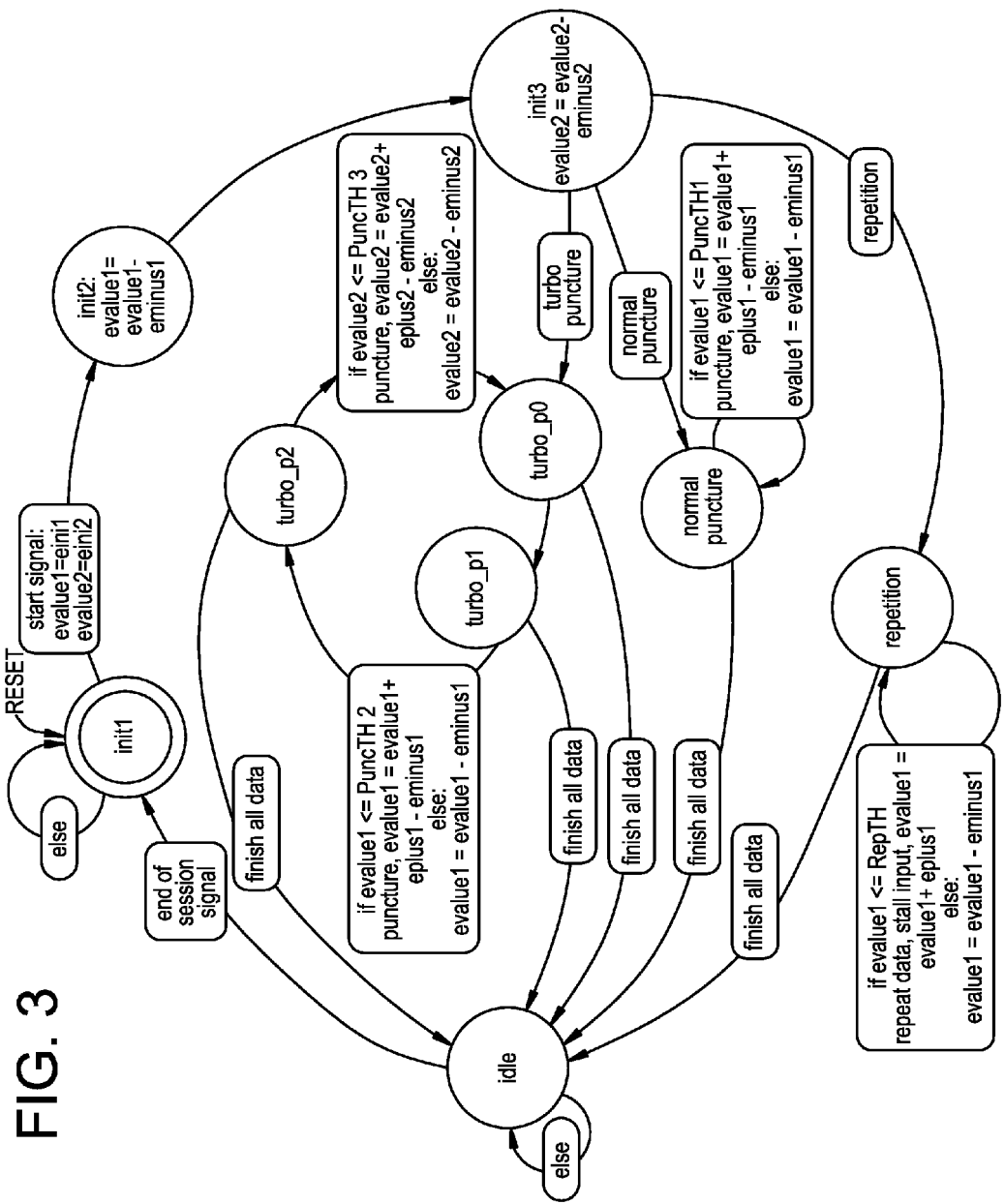
FIG. 3 illustrates one exemplary embodiment of the state-machine in FIG. 2.

FIG. 3 illustrates one exemplary embodiment of the state-machine 30. The state-machine 30 is implemented in dedicated hardware 6 by preparing VHDL code describing the state-machine 30, and having the VHDL compiler generate the dedicated hardware architecture implementing the state-machine 30. Accordingly, the operation of the state-machine 30 and dedicated hardware 6 will now be described with respect to FIGS. 2 and 3.

Referring to FIG. 3, operation begins in a first initial state init1. The first initial state init1 is achieved when a signal processing session ends or when a signal processing session has been reset. Namely, when a reset signal is asserted, all flip-flops return to their reset state, as do the state machines. The state-machine 30 remains in the first initial state init1 until a processing start signal is received from the DSP 4. The processing start signal provides the rate matching parameters for one payload of data to be processed. A payload of data is a transmission time interval (TTI) worth of data for a transport channel (TrCH).

As shown in FIG. 3, the rate matching parameters include an initial value eini1 for at least a first decision parameter evalue1. As described in more detail below, the state-machine according to the present invention handles more than one format of encoding, such as convolutional encoding and turbo encoding. In convolutional encoding all data is treated the same—a same type, and therefore, only a single decision parameter evalue1 is required. However, in turbo encoding, more than one type of data exists—such as systematic data, first parity data and second parity data. In turbo encoding, the systematic data does not undergo puncturing, and the first and second parity data are treated separately when a puncture operation is to be performed on turbo encoded data. As a result, if the state-machine 30 is to operate on turbo encoded data and perform puncturing, then evalues for both the first and second parity data are supplied by the DSP4. Namely, initial values eini1 and eini2 are respectively supplied for first and second decision parameters evalue1 and evalue2, which are associated with the first and second parity data, respectively. However, if the data is convolution encoded, or the data is turbo encoded but a repetition process is to be performed on the data, then only a value for the first decision parameter evalue1 is supplied by the DSP4.

Upon receipt of the processing start signal, the state-machine 30 establishes the initial values eini1 and eini2 for the first and second decision parameters evalue1 and evalue2, transitions from the first initial state init1 to a second initial state init2 and then a third initial state init3. In the second initial state init2, the first decision parameter evalue1 is decreased by a first decrement value eminus1, which was supplied as one of the rate matching parameters by the DSP 4. In the third initial state init3, the second decision parameter evalue2 is decreased by a second decrement value eminus2, which was supplied as one of the rate matching parameters by the DSP4, if the data being processed is turbo encoded. Otherwise, no such operation is performed in the third initial state init3.

As shown in Table 1, the DSP 4 provides, as one of the rate matching parameters, a coding scheme indicator dlc_tr_emode, which indicates the coding scheme applied to the data (e.g., none, convolutional, turbo, etc.). As further shown in Table 1, the DSP 4 also provides a puncture/repetition parameter dlc_tr_punc, the sign of which indicates whether a puncture or repetition process is to be performed on the data. Based on the coding scheme indicator and the puncture/repetition parameter, the state-machine 30 knows the operation to perform in the third initial state init3.

Repetition

If the puncture/repetition parameter indicates that a repetition process is to be performed on the data, then processing proceeds to a repetition state. The dedicated hardware 6, and therefore, the state-machine 30 operates on a unit of data. The unit of data can be one or more bits. For ease of explanation only, the operation of the dedicated hardware 6 and the state-machine 30 will be described assuming the unit of data is one bit. In the repetition mode of operation, for each unit of data (e.g., 1 bit in the remainder of this description) the state-machine 30 determines if the first decision parameter evalue1 is less than or equal to a repetition threshold RepTH. In one exemplary embodiment, the repetition threshold RepTH is zero. If so, then the state-machine 30 determines that the data should be repeated. Accordingly, the state-machine 30 (1) sends a stall output signal to the encoder 20 instructing the encoder 20 to stall its outputting of data; (2) generates an output validity indicator indicating valid data; (3) generates a selection signal that causes the selector 40 to output the previously output data stored in the first register 34; and (4) increments the first decision parameter evalue1 by an increment value eplus1, which the DSP 4 supplied as one of the rate-matching parameters. In causing the repetition of data, the state-machine 30 generates the selection signal such that the selector 40 outputs the same bit a number of times as indicated by the puncture/repetition parameter.

If the first decision parameter evalue1 is not less than or equal to the repetition threshold RepTH, then the state-machine 30 (1) generates a selection signal that causes the selector 40 to output the current data from the encoder 20, (2) generates an output validity indicator indicating valid data; and (3) decreases the first decision parameter evalue1 by the first decrement value eminus1. This process continues until the data payload has been processed. The end of the payload is determined using the dlc_tr_niltti parameter, which is the number of bits in the payload coming into the rate matching block.

Once the data payload has been processed, the state machine 30 moves to an idle state. The state machine 30 will remain in the idle state until an end of session signal is received from the DSP 4.

Puncture

Returning to the third initial state init3, if the coding scheme indicator dlc_tr_emode indicates the convolutional coding scheme and the puncture/repetition parameter dlc_tr_punc indicates puncture, then a normal puncture process is to be carried out and the state-machine 30 moves to the normal puncture state.

In the normal puncture mode of operation, for an input data, the state-machine 30 determines if the first decision parameter evalue1 is less than or equal to a first puncture threshold PuncTH1. In one exemplary embodiment, the first puncture threshold PuncTH1 is zero. If so, then the state-machine 30 determines that the data should be punctured. Accordingly, the state-machine 30 (1) generates a selection signal that causes the selector 40 to output the input data currently received from the encoder 20; (2) generates an output validity indicator indicating invalid data; and (3) increments the first decision parameter evalue1 by the increment value eplus1 and decrements the resulting sum by the decrement value eminus1 (only once for the duration of the puncture process). In causing the puncture of data, the state-machine 30 generates the selection signal and de-asserts the output validity indicator such that the data bit is effectively removed from the data packet.

If the first decision parameter evalue1 is not less than or equal to the first puncture threshold PuncTH1, then the state-machine 30 (1) generates a selection signal that causes the selector 40 to output the current data from the encoder 20; (2) generates an output validity indicator indicating valid data and (3) decreases the first decision parameter evalue1 by the first decrement value eminus1. This process continues until the data payload has been processed.

Once the data payload has been processed, the state machine 30 moves to the idle state. The state machine 30 will remain in the idle state until an end of session signal is received from the DSP 4.

Puncture of Turbo Encoded Data

Returning again to the third initial state init3, if the coding scheme indicator dlc_tr_emode indicates the turbo coding scheme and the puncture/repetition parameter dlc_tr_punc indicates puncture, then a turbo puncture process is to be carried out and the state-machine 30 moves to a systematic turbo puncture state turbo_p0. As discussed previous, turbo encoded data input from the encoder 20 includes three data streams multiplexed onto one serial interface in the following order: s(0), p1(0), p2(0), s(1), p1(1), p2(1), s(2) . . . p2(i), where s=systematic, p1=parity1, p2=parity2, and (i) is the ith bit in the individual bit stream. As also discussed above, the first parity data and the second parity data undergo puncture, but not the systematic data. Accordingly, in the systematic turbo puncture state, the state-machine 30 (1) generates a selection signal that causes the selector 40 to output the input data currently received from the encoder 20; and (2) generates an output validity indicator indicating valid data. After the systematic data has been processed in this fashion, the state-machine 30 enters the first parity turbo puncture state turbo_p1

In the first parity turbo puncture state, for each first parity data, the state-machine 30 determines if the first decision parameter evalue1 is less than or equal to a second puncture threshold PuncTH2. In one exemplary embodiment, the second puncture threshold PuncTH2 is zero. If so, then the state-machine 30 determines that the data should be punctured. Accordingly, the state-machine 30 (1) generates a selection signal that causes the selector 40 to output the input data currently received from the encoder 20; (2) generates an output validity indicator indicating invalid data; and (3) increments the first decision parameter evalue1 by the increment value eplus1 and decrements the resulting sum by the decrement value eminus1. In causing the puncture of the first parity data, the state-machine 30 generates the selection signal and de-asserts the output validity indicator such that the data bit is effectively removed from the data packet.

If the first decision parameter evalue1 is not less than or equal to the second puncture threshold PuncTH2, then the state-machine 30 (1) generates a selection signal that causes the selector 40 to output the current data from the encoder 20; (2) generates an output validity indicator indicating valid data and (3) decreases the first decision parameter evalue1 by the first decrement value eminus1.

After the first parity data has been processed, the state-machine 30 enters the second parity turbo puncture state turbo_p2

In the second parity turbo puncture state, for each second parity data, the state-machine 30 determines if the second decision parameter evalue2 is less than or equal to a third puncture threshold PuncTH3. (In one exemplary embodiment, the third puncture threshold PuncTH3 is zero.) If so, then the state-machine 30 determines that the second parity data should be punctured. Accordingly, the state-machine 30 (1) generates a selection signal that causes the selector 40 to output the input data currently received from the encoder 20; (2) generates an output validity indicator indicating invalid data; and (3) increments the second decision parameter evalue1 by a second increment value eplus2 and decrements the resulting sum by a second decrement value eminus2. As indicated in Table 1, both eplus2 and eminus2 are rate-matching parameters received from the DSP4. In causing the puncture of the first parity data, the state-machine 30 generates the selection signal and de-asserts the output validity indicator such that the data bit is effectively removed from the data packet. If the second decision parameter evalue2 is not less than or equal to the third puncture threshold PuncTH3, then the state-machine 30 (1) generates a selection signal that causes the selector 40 to output the current data from the encoder 20; (2) generates an output validity indicator indicating valid data and (3) decreases the second decision parameter evalue2 by the second decrement value eminus2.

The state-machine 30 then returns to the systematic turbo puncture state turbo_p0, and the processing in the above described turbo puncture states repeats until the data payload has been processed. Once the data payload has been processed, the state machine 30 moves to the idle state. The state machine 30 will remain in the idle state until an end of session signal is received from the DSP 4 or a reset signal is received.

The repetition and puncture thresholds used by the state-machine 30 are, in one exemplary embodiment, values fixed in the state-machine 30 to zero.

Puncturing/Repetition Pattern

Figure 4:
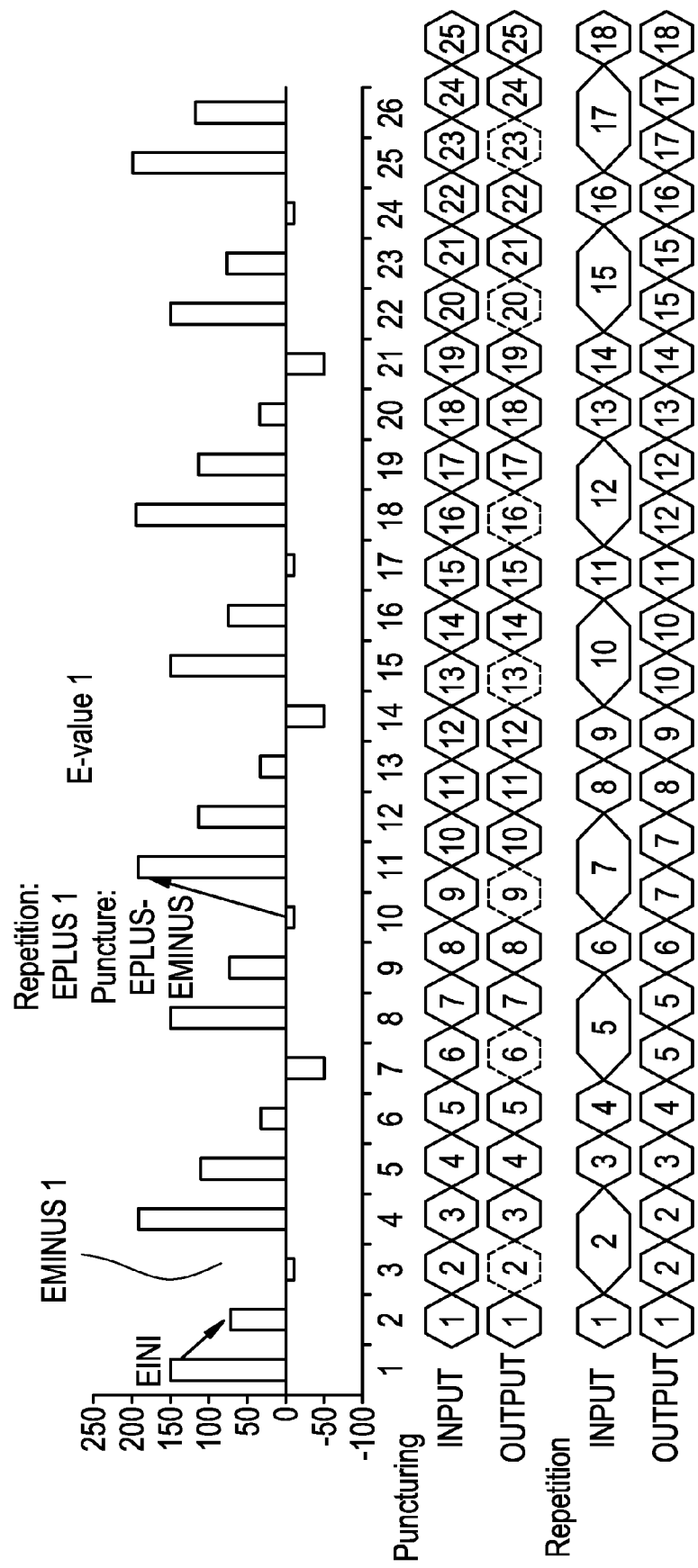
FIG. 4 illustrates an example of generated puncture and repetition patterns and changes in the first decision parameter evalue1 as the input data is processed according to the state-machine of FIG. 3.

From the decision parameter values calculated in firmware, the dedicated hardware 6 can generate the puncturing/repetition pattern. An example of generated puncture and repetition patterns, where all thresholds have been set to zero is shown in FIG. 4. FIG. 4 also illustrates the changes in the first decision parameter evalue1 as the input data is processed. As shown, the first decision parameter evalue1 is set to EINI and then reduced by eminus1 (first and second initial states of the state-machine 30), then for each input data processed without puncture or repetition, the first decision parameter evalue1 is reduced by the decrement parameter eminus1. If the resulting first decision parameter evalue1 is negative or zero, the data is punctured/repeated and the first decision parameter evalue1 is increased by eplus1 when in the repetition mode or increased by (eplus1−eminus1) when in the puncture mode.

More Embodiments of Downlink Rate Matching Dedicated Hardware Architecture

Figure 5:
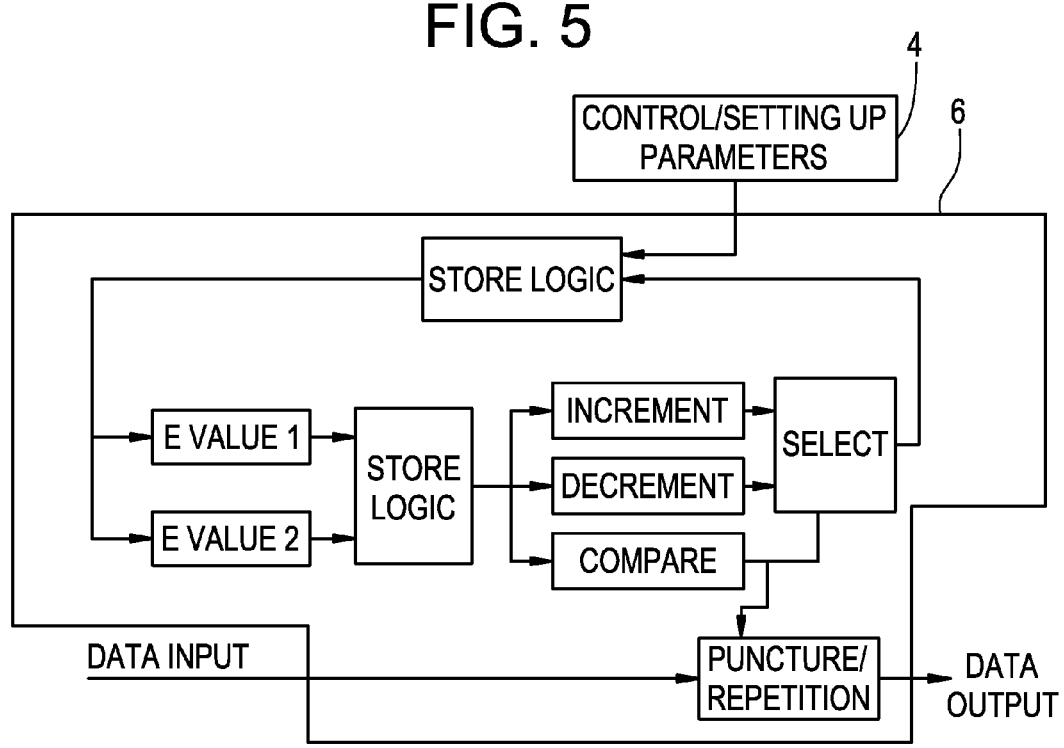
FIG. 5 illustrates a structured combinatorial logic implementation of the dedicated hardware in FIG. 1.

There are many ways to implement rate-matching dedicated hardware. A state-machine implementation has been described above. FIG. 5 illustrates a structured combinatorial logic implementation of the dedicated hardware 6. This approach breaks down the dedicated hardware into smaller components. Each component has a simple function or process logic. The designer can use various ways to design each logic block, which includes using state machines, truth tables, branch functions or wired logic gates.

Rate-Matching for HSDPA

Figure 6:
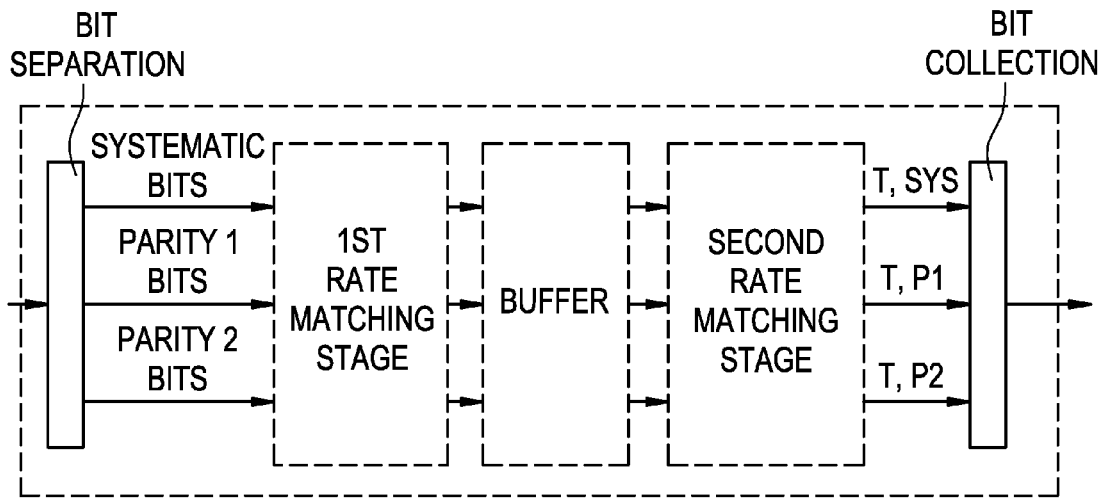
FIG. 6 illustrates a functional block diagram for HS-DSCH HARQ that includes two rate-matching stages implemented according to the present invention.

Rate-Matching is used in HSDPA (High Speed Downlink Packet Access). In the Hybrid ARQ function of HSDPA, two rate-matching stages are needed as shown in FIG. 6. The downlink rate matching embodiments of the present invention can be used as the first rate matching stage by setting the dedicated hardware 6 to the turbo puncturing mode, and can be used as the second rate matching stage by setting the dedicated hardware 6 to the normal puncturing mode or normal repetition mode.

Architecture of Dedicated Hardware for Puncturing/Repetition Compensation Process In describing the dedicated hardware architecture for the puncturing/repetition compensation process, a state-machine dedicated hardware implementation of the present invention will be described in detail. Puncturing compensation (de-puncturing) is the process of inserting bits into a data packet at locations where bits were previously punctured, thereby returning the data packet to its original size. Repetition compensation (de-repeating) is the process of removing bits from a data packet at locations where bits were previously inserted (repeated), thereby returning the data packet to its original size. The rate at which data bits are de-punctured or de-repeated is controlled by rate-matching parameters.

In an exemplary embodiment of the present invention described in detail below, data coming into the rate-de-matching block comes in the form of Log Likelihood Ratio (LLR) soft bits. These LLRs use multiple binary digits to represent the likelihood that a received bit is a "1" or a "0". Thus each data bit is represented by multiply binary digits.

Definitions, Symbols and Abbreviations

Table 2 provides a list of the names/symbols used for the rate de-matching parameters calculated in the DSP 12 along with (i) their corresponding symbol or name in the 3GPP standard and (ii) associated description.

TABLE 2

| Name | In 3GPP Standard | Description |
|---|---|---|
| eini1 | $e_{ini}$ | Initial value of decision parameter or variable e in the rate matching pattern determination algorithm.<br>For repetition mode, normal puncturing mode and parity 1 bits in turbo puncturing mode. |
| eini2 | $e_{ini}$ | Initial value of decision parameter or variable e in the rate matching pattern determination algorithm.<br>For parity 2 bits in turbo puncturing mode. |
| eplus1 (ep1) | $e_{plus}$ | Increment of variable e in the rate matching pattern determination algorithm<br>For repetition mode, normal puncturing mode and parity 1 bits in turbo puncturing mode. |
| eplus2 (ep2) | $e_{plus}$ | Increment of variable e in the rate matching pattern determination algorithm.<br>For parity 2 bits in turbo puncturing mode. |
| eminus1(em1) | $e_{minus}$ | Decrement of variable e in the rate matching pattern determination algorithm<br>For repetition mode, normal puncturing mode and parity 1 bits in turbo puncturing mode. |
| eminus2(em2) | $e_{minus}$ | Decrement of variable e in the rate matching pattern determination algorithm.<br>For parity 2 bits in turbo puncturing mode. |
| e value 1 | e in 4.2.7.5 | Value of variable e in the rate matching pattern determination algorithm<br>For repetition mode, normal puncturing mode and parity 1 bits in turbo puncturing mode. |
| e value 2 | e in 4.2.7.5 | Value of variable e in the rate matching pattern determination algorithm<br>For parity 2 bits in turbo puncturing mode. |
| TTI | TTI | Transmission Time Interval |
| i in FIG. 10 | $P1_F(n_i)$ | The column permutation function of the $1^{st}$ interleaver, $P1_F(x)$ is the original position of column with number x after permutation. P1 is defined on table 4 of section 4.2.5.2 (note that the $P1_F$ is self-inverse). Used for rate matching in uplink only.<br>This is the received frame number in a TTI, which is already interleaved. |
| INT1POLY(i) in FIG. 10 | $n_i$ | Radio frame number in the transmission time interval of TrCH i ($0 \leq n_i < F_i$). |
| rm_nij | $N_{i,j}$ | Number of bits in a radio frame before rate matching on TrCH i with transport format combination j. |
| rm_punc | Sign of $\Delta N_{i,j}$ | $\Delta N_{i,j}$: If positive - number of bits that should be repeated in each radio frame on TrCH i with transport format combination j.<br>If negative - number of bits that should be punctured in each radio frame on TrCH i with transport format combination j. |
| rm_tb | Coding scheme | Turbo or other type |

Uplink Rate De-Matching Dedicated Hardware

Figure 7:
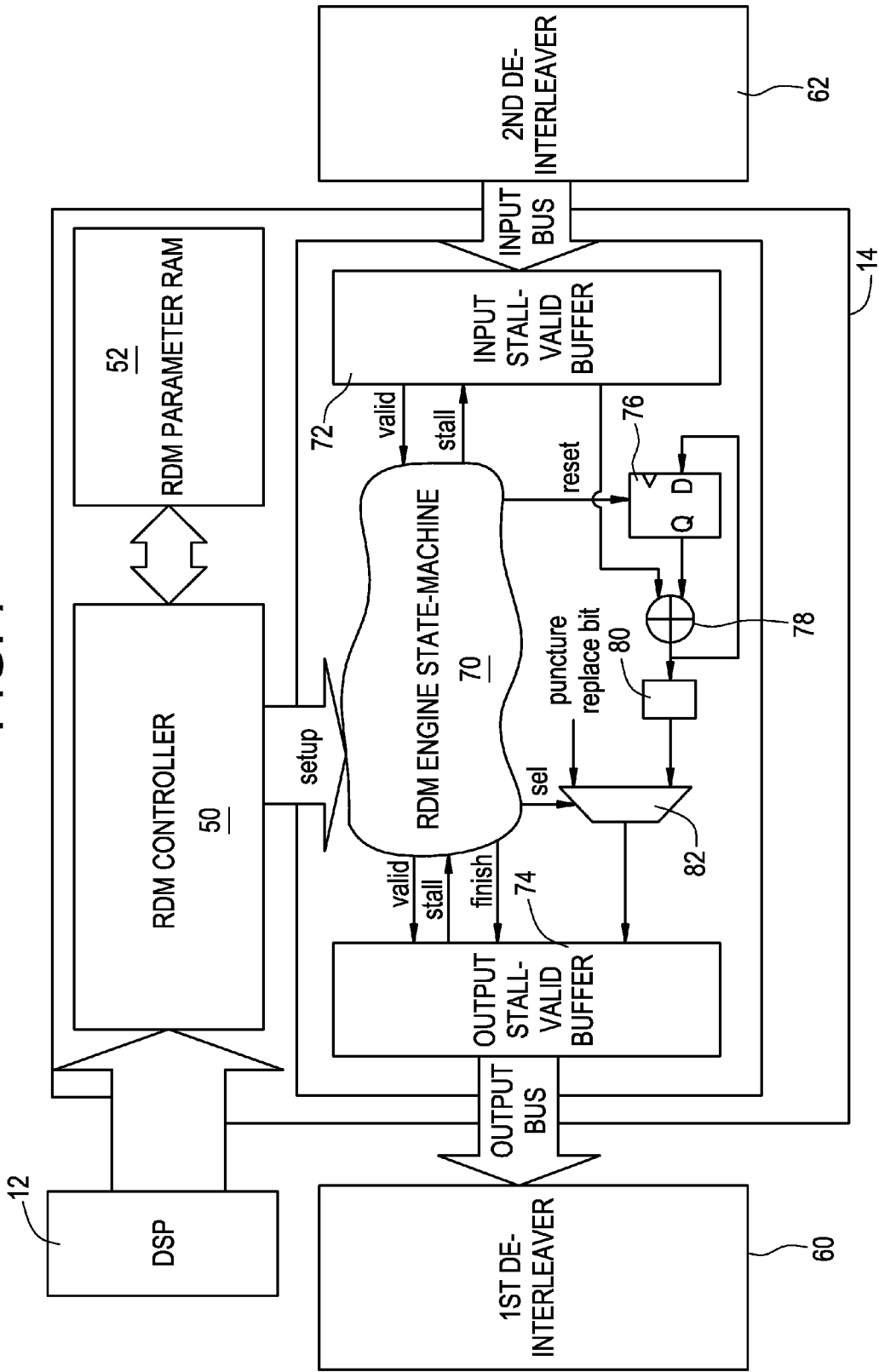
FIG. 7 illustrates a block diagram of the dedicated hardware architecture for rate de-matching (RDM) on receive side according to one embodiment of the present invention, where the embodiment is employed between first and second de-interleavers.

FIG. 7 illustrates a block diagram of the dedicated hardware architecture for rate de-matching (RDM) on the receiver side according to one embodiment of the present invention, where the embodiment is employed between first and second de-interleavers (e.g., as in TS25.212 mentioned previously). As shown, on the input side, the dedicated hardware 14 receives the calculated rate de-matching parameters from the DSP 12, and receives input (e.g., data and signaling) from a second de-interleaver 62. The dedicated hardware 14 also supplies output (e.g., data and signaling) to a first de-interleaver 60.

The dedicated hardware 14 includes a RDM controller 50 receiving the rate de-matching parameters calculated by the DSP 12, and stores the received RDM parameters in a RAM 52. From the RDM parameters, the RDM controller 50 prepares the setup parameters for a state-machine 70, which controls the de-repetition and de-puncture operations. The state machine 70 is disposed between an input stall-valid buffer 72, which receives the input from the second de-interleaver 62, and an output stall-valid buffer 74, which supplies the output to the first de-interleaver 60. The state-machine 70 receives the rate de-matching and setup parameters from the RDM controller 50, an input validity indicator from the input stall-valid buffer 72, and an output stall indicator from the output stall-valid buffer 74. The state-machine 70 outputs an output validity indicator to the output stall-valid buffer 74, a finish indicator to the output stall-valid buffer 74.

The dedicated hardware 14 further includes a latch 76, an accumulator 78 and a bit clamp 80. The latch 76 latches output from the accumulator 78 and is reset in response to a reset signal from the state-machine 70. The accumulator 78 adds the output of the latch with the output from the input stall-valid buffer 72. The bit clamp 80 clamps the number of bits representing the accumulated value to a preset number of bits (e.g., 5 bits).

A selector 82 selectively outputs one of the output from the bit clamp 80, a zero value and a puncture/replace bit based on a data selection signal generated by the state-machine 70. The output from the selector 82 is stored in the output stall-valid buffer 74.

In the uplink, the rate de-matching dedicated hardware 14 uses the uplink rate de-matching parameters calculated by the DSP 12 to determine the bit pattern of the punctured/repeated data on the fly. For punctured data, the rate de-matching dedicated hardware 14 inserts a pre-defined puncture replace LLR value to its output. For the repeated LLRs (created through repetition during rate matching), which belong to the same bit, the rate de-matching dedicated hardware 14 accumulates/saturates their values to achieve a higher effective signal-to-noise ratio (SNR) on the bit. The operation of the rate de-matching dedicated hardware 14 will be described in greater detail below with respect to FIGS. 9-11.

RDM Controller

The rate de-matching controller 50 has two functions: store input RDM parameters during configuration, and setup the RDM state-machine 70 for data processing. Apart from controlling the RAM 52 and passing parameters to the state-machine 70, the RDM controller 52 sets up the initial state for bit separation when the input data calls for turbo de-puncturing.

Bit separation is needed only for de-puncturing turbo punctured data. A coding scheme indicator rm_tb received from the DSP 12 indicates the coding scheming of the input data (e.g., convolutional or turbo), and the sign of a puncture/repetition parameter rm_punc received from the DSP 12 indicates whether compensation for puncture or repetition is to be performed. When the coding scheme indicator and puncture/repetition parameter indicate turbo punctured data, a set of rate de-matching parameters (e.g., eini1, eplus1 and eminus1) is provided for the first parity data and another set of rate de-matching parameters (e.g., eini2, eplus2 and eminus2) is provided for the second parity data. To rate de-match other types of data (turbo repeated, convolutional punctured, convolutional repeated, etc.), the data input are treated as one serial bit stream, and a single set of rate de-matching parameters (e.g., eini1, eplus1, and eminus1) is used to determine the de-matching pattern.

The input to the rate de-matching dedicated hardware 14 may be in interleaved order. The reason for this is that the first de-interleaver 60 following the dedicated hardware 14 de-interleaves the data which was interleaved on the transmit side. As described earlier, the data processed by the dedicated hardware 14 is a radio frame worth of data. One or more radio frames of data will make up a TTI of a TrCH. This is the size of data over which the interleaver on the transmit side interleaves. It is possible to have a TTI of length 1, 2, 4 or 8 radio frames, corresponding to 10, 20, 40 or 80 ms TTI. The order in which each radio frame in a TTI arrives to the dedicated hardware 14 is shown for each case.

10 ms TTI <0>
20 ms TTI <0,1>
40 ms TTI <0,2,1,3>
80 ms TTI <0,4,2,6,1,5,3,7>

For de-puncturing/de-repeating turbo encoded data, the first received data bit of each radio frame is one of the systematic, parity 1 and parity 2 bits and can be determined from the data's de-interleaved frame number and its transmission time interval (TTI). Hence, the dedicated hardware 14 takes this into consideration when setting up the initial puncturing state and sequence.

Figure 8:
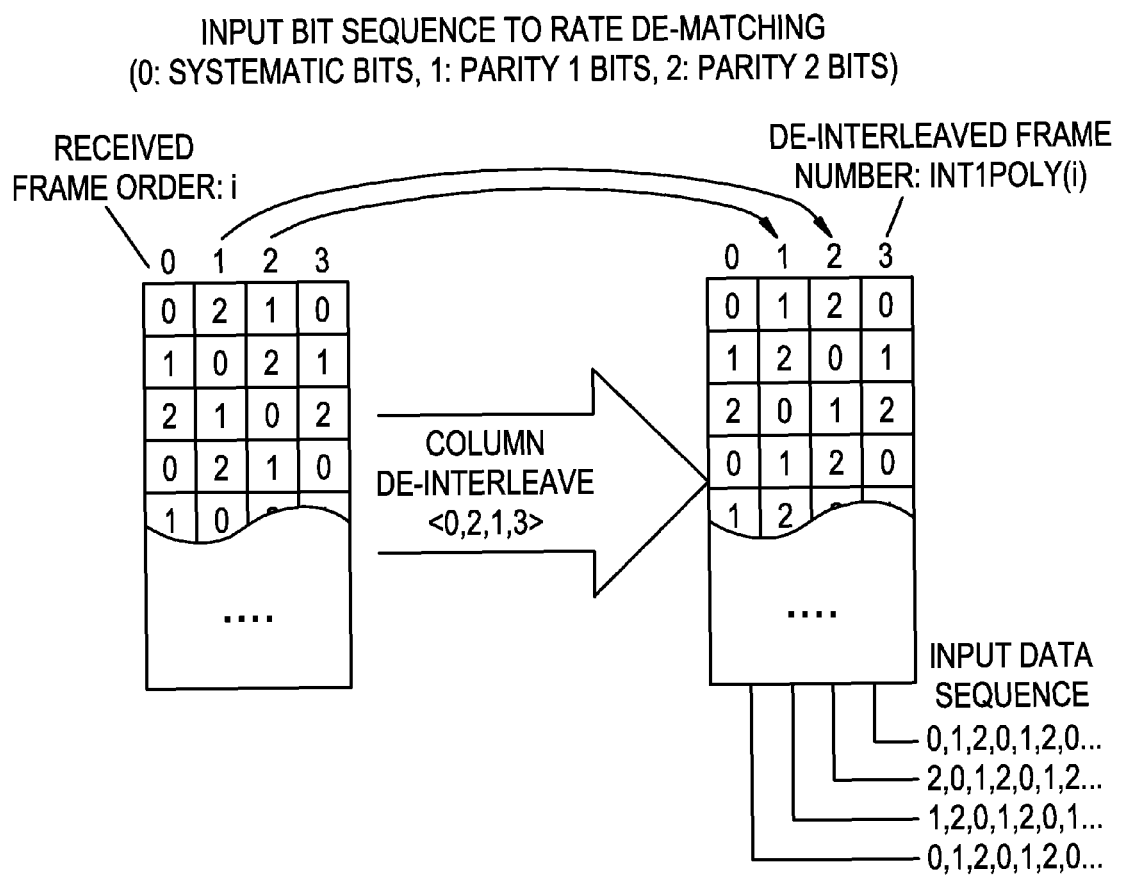
FIG. 8 illustrates an example of the input data sequence for a transport channel (TrCH) with a 40 ms TTI.

FIG. 8 illustrates an example of the input data sequence for a transport channel (TrCH) with a 40 ms TTI. In FIG. 8, and the remainder of this disclosure, when discussing the order of the systematic, first parity p1 and second parity p2 bits, "0" represents a systematic bit, "1" represents the first parity bit, and "2" represents the second parity bit. As shown, the input bit sequences are different for each de-interleaved column—also referred to as a frame phase. This is because at the transmission side, before first level interleaving, data are stored in the memory with sequence "0, 1, 2" row by row (See the rows on the right side of FIG. 8). Therefore, for a 40 ms TTI TrCH, column 0 before interleaving always has sequence "0, 1, 2" and column 1 always has sequence "1, 2, 0".

The DSP 12 provides a column permutation function indicator ("i" in FIG. 8 and Table 3 discussed below) and the TTI as part of the rate de-matching parameters. This indicates to the RDM controller 50 the frame phase being received. For every frame phase (column) received, the RDM controller 50 has to work out the bit sequence based on the de-interleaved column number of the sequence using the TrCH's TTI, 1st interleaver polynomial and frame phase in TTI. Specifically, the RDM controller 50 looks up the sequence in an input sequence lookup table, and sets up the initial puncturing state/sequence before starting de-puncturing of the data. Table 3 below illustrates an exemplary embodiment of the input sequence lookup table.

TABLE 3

| | INT1POLY(i) | | | | | | | |
|---|---|---|---|---|---|---|---|---|
| TTI | 0 | 1 | 2 | 3 | 4 | 5 | 6 | 7 |
| 10 ms | 0, 1, 2 | X | X | X | X | X | X | X |
| 20 ms | 0, 2, 1 | 1, 0, 2 | X | X | X | X | X | X |
| 40 ms | 0, 1, 2 | 1, 2, 0 | 2, 0, 1 | 0, 1, 2 | X | X | X | X |
| 80 ms | 0, 2, 1 | 1, 0, 2 | 2, 1, 0 | 0, 2, 1 | 1, 0, 2 | 2, 1, 0 | 0, 2, 1 | 1, 0, 2 |

Accordingly, when the input data is turbo encoded punctured data, the RDM controller 50 accesses the input sequence lookup table using the TTI and column permutation function indicator, and generates two set up parameters in addition to the rate de-matching parameters received from the DSP 12. The first setup parameter is the starting turbo bit indicator rm_tbbit, which indicates whether the first bit being processed is systematic data, first parity data or second parity data. The second parameter is the turbo sequence direction indicator rm_clkwise, which indicates whether the sequence of the turbo encoded data is (1) systematic, first parity, second parity, systematic, etc., or (2) second parity, first parity, systematic, second parity, etc.

Rate De-Matching State-Machine

Figure 9:
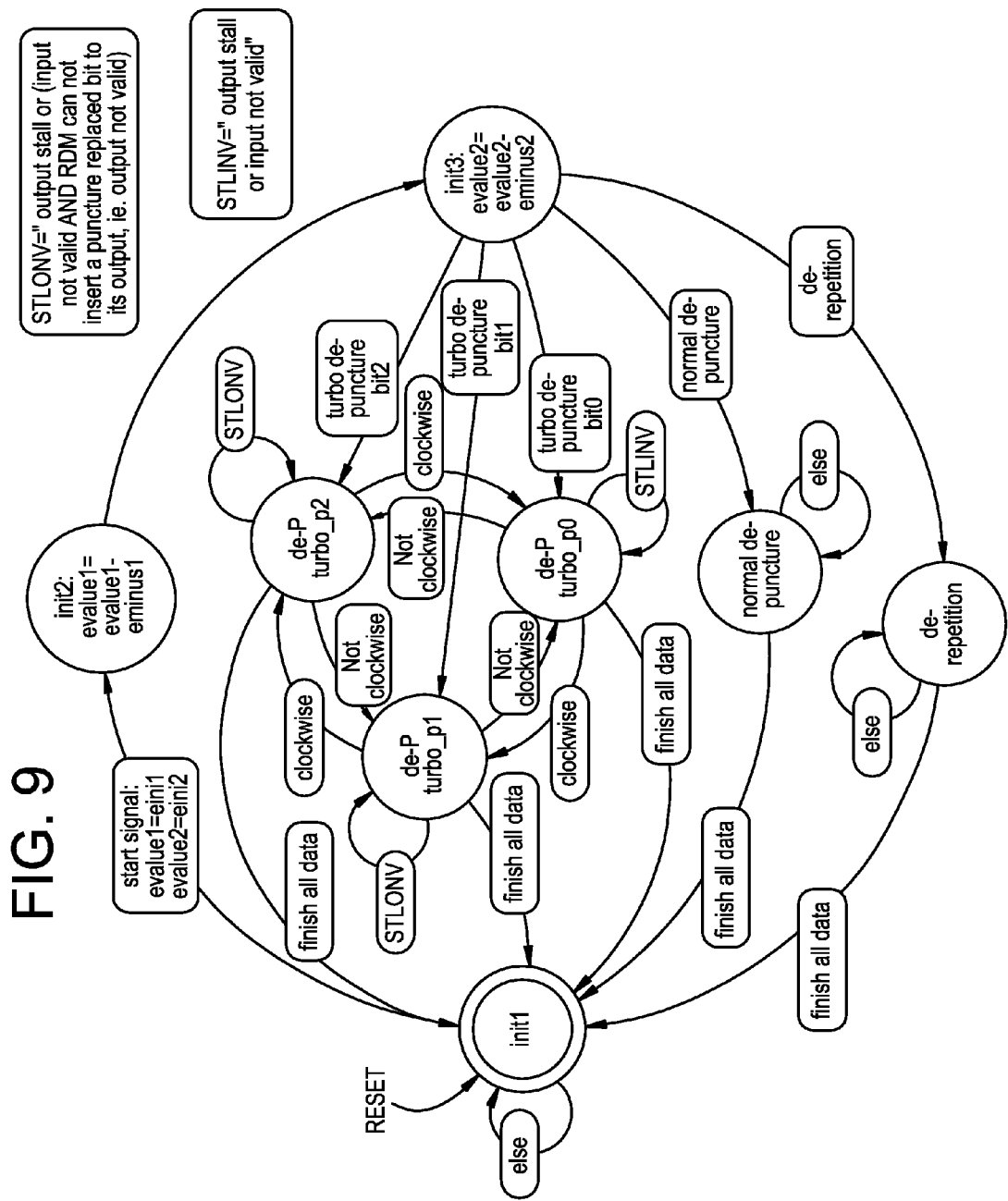
FIG. 9 illustrates one exemplary embodiment of the state-machine in FIG. 7.

FIG. 9 illustrates one exemplary embodiment of the state-machine 70. The state-machine 70 is implemented in dedicated hardware 14 by preparing VHDL code describing the state-machine 70, and having the VHDL compiler generate the dedicated hardware architecture implementing the state-machine 70. Accordingly, the operation of the state-machine 70 and the remaining portions of the dedicated hardware 14 will now be described with respect to FIGS. 7 and 9.

Referring to FIG. 9, operation begins in a first initial state init1. The first initial state init1 is achieved when a signal processing session ends or when a signal processing session has been reset. The state-machine 70 remains in the first initial state init1 until a processing start signal is received from the DSP 12 via the RDM controller 50. The processing start signal provides the rate matching parameters, and possibly the set up parameters, for one payload of data to be processed. A payload of data is, for example, a radio frame of data for a TrCH.

As shown in Table 2, the rate de-matching parameters include an initial value eini1 for at least a first decision parameter evalue1. If the state-machine 70 is to operate on turbo encoded data and perform de-puncturing, then initial evalues for both the first and second parity data are supplied by the DSP 12. Namely, initial values eini1 and eini2 are respectively supplied for first and second decision parameters evalue1 and evalue2, which are associated with the first and second parity data, respectively. However, if the data is convolution encoded, or the data is turbo encoded but a de-repetition process is to be performed on the data, then only the first decision parameter evalue1 is supplied by the DSP 12.

Upon receipt of the processing start signal, the state-machine 70 sets the initial values of the decision parameter(s), transitions from the first initial state init1 to a second initial state init2 and then a third initial state init3. In the second initial state init2, the first decision parameter evalue1 is decreased by a first decrement value eminus1, which was supplied as one of the rate de-matching parameters by the DSP 12 via the RDM controller 50. In the third initial state init3, the second decision parameter evalue2 is decreased by a second decrement value eminus2, which was supplied as one of the rate de-matching parameters by the DSP 12 via the RDM controller 50, if the data being processed is turbo encoded punctured data. Otherwise, no such operation is performed in the third initial state init3. Accordingly, based on the coding scheme indicator and the puncture/repetition parameter, the state-machine 70 knows the operation to perform in the third initial state init3.

De-Repetition

If the puncture/repetition parameter indicates that a de-repetition process is to be performed on the data (turbo or convolutional), then processing proceeds to a de-repetition state. The dedicated hardware 14, and therefore, the state-machine 70 operates on a unit of data. The unit of data can be one or more bits. For ease of explanation only, the operation of the dedicated hardware 14 and the state-machine 70 will be described assuming the unit of data is one bit.

In the de-repetition mode of operation, for each unit of data (e.g., 1 bit in the remainder of this description) the state-machine 70 determines if the first decision parameter evalue1 is less than or equal to a de-repetition threshold DrepTH. In one exemplary embodiment, the repetition threshold DrepTH is zero. If so, then the state-machine 70 determines that the data should undergo a de-repetition operation. Accordingly, the state-machine 70 (1) sends an invalid output signal to the output stall-valid buffer 74 instructing the output stall-valid buffer 74 that the output received is invalid; (2) generates a selection signal that causes the selector 82 to output the data generated by the clamp 80; (3) turns the reset signal for the latch 76 off to permit accumulation; and (4) increments the first decision parameter evalue1 by an increment value eplus1 (this last operation is performed only once during the de-repetition process).

In causing the de-repetition of data, the state-machine 70 generates the selection signal and the reset signal such that the selector 82 outputs the data from the clamp 80 and the latch 76 continues latching the output from the accumulator 78 for the number of input bits indicated by the puncture/repetition parameter received from the DSP 12 via the RDM controller 50.

The input data to the RDM dedicated hardware 14 in one exemplary embodiment is a stream of 5 bit LLR, value range from −16 to +15. The output of the RDM dedicated hardware 14 is also 5 bit LLR, value from −15 to +15, and puncture replaces a bit, represented by value −16. In this exemplary embodiment, the accumulator 78 is an 8-bit accumulator that accumulates/saturates the LLR value to range −128 to +127. This accumulation process increases the SNR for repeated bits. The accumulator output is clamped down to range −15 to +15 by the clamp 80. During the accumulation process, the latch 76, which is an 8 bit register, stores the accumulated LLR.

Once the amount of input data indicated by the puncture/repetition parameter has undergone the accumulation process, the state machine 70 (1) turns the reset signal back on; and (2) generates an output validity indicator indicating valid data. Accordingly, the clamped, accumulated value output by the selector 82 is considered valid data, and the input data has been de-repeated.

If, at the beginning of the de-repetition state, the first decision parameter evalue1 is not less than or equal to the de-repetition threshold DrepTH, then the state-machine 70 (1) generates a selection signal that causes the selector 70 to output the output from the accumulator 82; (2) generates an output validity signal indicating valid data; and (3) decreases the first decision parameter evalue1 by the first decrement value eminus1. This process continues until the data payload has been processed.

Once the data payload has been processed, the state machine 70 moves to the first initial state. The state machine 70 will remain in the first initial state until the next processing start signal is received.

De-Puncture

Returning to the third initial state init3, if the coding scheme indicator indicates the convolutional coding scheme and the puncture/repetition parameter indicates puncture, then a normal de-puncture process is to be carried out and the state-machine 70 moves to the normal de-puncture state.

In the normal de-puncture mode of operation, for each unit of data, the state-machine 70 determines if the first decision parameter evalue1 is less than or equal to a first de-puncture threshold DpuncTH1. (In one exemplary embodiment, the first de-puncture threshold DpuncTH1 is zero.) If so, then the state-machine 70 determines that the data should be de-punctured. Accordingly, the state-machine 70 (1) generates a selection signal that causes the selector 82 to output the puncture replace bit; (2) generates an output validity indicator indicating valid data; (3) generates an input stall indicator indicating to stall the input of data from the input stall-valid buffer 72; and (4) increments the first decision parameter evalue1 by the increment value eplus1 and decrements the resulting sum by the decrement value eminus1. In causing the de-puncture of data, the state-machine 70 generates the selection signal and input stall indicator such that the selector 82 outputs the puncture replace bit a number of times as indicated by the puncture/repetition parameter. In one exemplary embodiment, the puncture replace bit is an LLR value of −16.

If the first decision parameter evalue1 is not less than or equal to the first de-puncture threshold DpuncTH1, then the state-machine 70 (1) generates a selection signal that causes the selector 82 to output the output from the clamp 80; (2) generates an output validity indicator indicating valid data; (3) generates an input stall indicator indicating not to stall the input data; and (4) decreases the first decision parameter evalue1 by the first decrement value eminus1. This process continues until the data payload has been processed.

Once the data payload has been processed, the state machine 70 move to the first initial state. The state machine 70 will remain in the first initial state until the next processing start signal is received.

De-Puncture of Turbo Encoded Data

Returning again to the third initial state init3, if the coding scheme indicator indicates the turbo coding scheme and the puncture/repetition parameter indicates puncture, then a turbo de-puncture process is to be carried out and the state-machine 70 moves to one of a systematic de-puncture state turbo_p0, a first parity de-puncture state turb0_p1 and a second parity de-puncture state turbo_p2 as indicated by the starting turbo bit indicator set up parameter. Namely, if the starting turbo bit indicator indicates the systematic bit, then the systematic de-puncture state is entered; if the starting turbo bit indicator indicates the first parity bit, then the first parity de-puncture state is entered; and if the starting turbo bit indicator indicates the second parity bit, then the second parity de-puncture state is entered.

As discussed previously, systematic data does not undergo puncture. Accordingly, in the systematic de-puncture state, the state-machine 70 (1) generates a selection signal that causes the selector 82 to output the output from the clamp 80; and (2) generates an output validity indicator indicating valid data. After the systematic bit has been processed, the state-machine 70 moves to one of the first parity de-puncture state and the second parity de-puncture state as indicated by the sequence direction indicator set up parameter. Namely, if the sequence direction indicator is true, then the first parity de-puncture state is entered; and if the sequence direction indicator is false, then the second parity de-puncture state is entered.

In the first parity de-puncture state, the state-machine 70 determines if the first decision parameter evalue1 is less than or equal to a second de-puncture threshold DpuncTH2. In one exemplary embodiment, the second de-puncture threshold DpuncTH2 is zero. If so, then the state-machine 70 determines that the data should be de-punctured. Accordingly, the state-machine 70 (1) generates a selection signal that causes the selector 82 to output the puncture replace bit; (2) generates an output validity indicator indicating valid data; (3) generates an input stall indicator indicating to stall the input of data from the input stall-valid buffer 72; and (4) increments the first decision parameter evalue1 by the increment value eplus1 and decrements the resulting sum by the decrement value eminus1. In causing the de-puncture of data, the state-machine 70 generates the selection signal and input stall indicator such that the selector 82 outputs the puncture replace bit a number of times as indicated by the puncture/repetition amount parameter. In one exemplary embodiment, the puncture replace bit is an LLR value of −16.

If the first decision parameter evalue1 is not less than or equal to the second de-puncture threshold PuncTH2, the state machine 70 (1) generates a selection signal that causes the selector 82 to output the output from the clamp 80; (2) generates an output validity indicator indicating valid data; (3) generates an input stall indicator indicating not to stall the input data; and (4) decreases the first decision parameter evalue1 by the first decrement value eminus1.

After the first parity bit has been processed, the state-machine 70 moves to one of the systematic de-puncture state and the second parity de-puncture state as indicated by the sequence direction indicator set up parameter. Namely, if the sequence direction indicator is true, then the second parity de-puncture state is entered; and if the sequence direction indicator is false, then the systematic de-puncture state is entered.

In the second parity turbo de-puncture state, the state-machine 70 determines if the second decision parameter evalue2 is less than or equal to a third de-puncture threshold DpuncTH3. In one exemplary embodiment, the third de-puncture threshold DpuncTH3 is zero. If so, then the state-machine 70 determines that the second parity data should be de-punctured. Accordingly, the state-machine 70 (1) generates a selection signal that causes the selector 82 to output the puncture replace bit; (2) generates an output validity indicator indicating valid data; (3) generates an input stall indicator indicating to stall the input of data from the input stall-valid buffer 72; and (4) increments the second decision parameter evalue2 by the second increment value eplus2 and decrements the resulting sum by the second decrement value eminus2. In causing the de-puncture of data, the state-machine 70 generates the selection signal and input stall indicator such that the selector 82 outputs the puncture replace bit a number of times as indicated by the puncture/repetition amount parameter. In one exemplary embodiment, the puncture replace bit is an LLR value of −16.

If the first decision parameter evalue2 is not less than or equal to the third de-puncture threshold DpuncTH3, the state-machine 70 (1) generates a selection signal that causes the selector 82 to output the output from the clamp 80; (2) generates an output validity indicator indicating valid data; (3) generates an input stall indicator indicating not to stall the input data; and (4) decreases the second decision parameter evalue2 by the second decrement value eminus2.

After the second parity bit has been processed, the state-machine 70 moves to one of the systematic de-puncture state and the first parity de-puncture state as indicated by the sequence direction indicator set up parameter. Namely, if the sequence direction indicator is true, then the systematic de-puncture state is entered; and if the sequence direction indicator is false, then the first parity de-puncture state is entered.

Processing in the above described turbo puncture states repeats until the data payload has been processed. Once the data payload has been processed, the state machine 70 moves to the first initial state. The state machine 70 will remain in the first initial state until the next processing start signal is received.

The de-repetition and de-puncture thresholds used by the state-machine 70 are, in one exemplary embodiment, values fixed in the state-machine 70 to zero. It will be appreciated that the DSP 12 can send rate de-matching parameters for multiple TrCHs during configuration; these parameters are stored in the RDM ram 52 by the RDM controller 50. The DSP 12 then tells the dedicated hardware 14 to start processing. The RDM controller 50 will read from the rate de-matching parameters for the RAM 52, setup the state-machine 70, and start the state-machine 50 to process one TrCH. The RDM controller 50 will repeat this process for multiple TrCHs until all TrCHs in the RAM 52 are processed.

Further Embodiments and Applications of Rate De-Matching

There are many ways to implement rate de-matching dedicated hardware. A state-machine implementation has been described above. As with the rate matching dedicated hardware, the rate de-matching dedicated hardware may be implemented by structured combinatorial logic. This architecture will be readily apparent from the forgoing structured combinatorial logic implementation of the rate matching dedicated hardware. Similarly, the application of the rate de-matching dedicated hardware to HSDPA will be readily apparent from the forgoing disclosure of the application of the rate matching dedicated hardware to HSDPA.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

We claim:

1. An apparatus for rate de-matching, comprising:
   a processor calculating at least one rate de-matching parameter for data;
   a controller receiving the at least one rate de-matching parameter and preparing setup parameters for a state machine circuit;
   the state machine circuit receiving the calculated rate de-matching parameters from the controller and configured to control a selector based on the calculated rate de-matching parameters; and
   the selector receiving a data selection signal from the state machine and configured to output one of a zero value, output from a bit clamp, and a puncture/replace bit based on the data selection signal.

2. The apparatus of claim 1, further including:
   a memory for storing the at least one rate de-matching parameter.

3. The apparatus of claim 1, further including:
   a first interleaver receiving output data and signaling from a first buffer; and
   a second interleaver inputting data and signaling to a second buffer.

4. The apparatus of claim 1, further including:
   a latch latching output from an accumulator and configured to reset in response to a reset signal from the state machine circuit;
   the accumulator adding the latch output with input data and outputting an accumulated value; and
   the bit clamp clamping the number of bits representing the accumulated value to a preset number of bits.

* * * * *